United States Patent [19]

Thomsen et al.

[11] Patent Number: 5,263,321
[45] Date of Patent: Nov. 23, 1993

[54] CONTROL ARRANGEMENT FOR A FULLY-HYDRAULIC STEERING SYSTEM

[75] Inventors: Svend E. Thomsen, Nordborg; Claus J. Johansen, Sonderborg; Hans C. Petersen, Nordborg, all of Denmark

[73] Assignee: Danfoss A/S, Denmark

[21] Appl. No.: 806,366

[22] Filed: Dec. 13, 1991

[30] Foreign Application Priority Data

Dec. 28, 1990 [DE] Fed. Rep. of Germany ....... 4042151

[51] Int. Cl.$^5$ ............................ B62D 5/06; B62D 15/02
[52] U.S. Cl. ....................................... 60/384; 180/132; 180/142
[58] Field of Search ............... 180/132, 141, 142, 143; 60/384

[56] References Cited

U.S. PATENT DOCUMENTS

| | | | |
|---|---|---|---|
| 4,356,759 | 11/1982 | Ljubimov et al. | 180/132 |
| 4,558,759 | 12/1985 | Baatrup et al. | 180/132 |
| 5,020,618 | 6/1991 | Nagao | 60/384 |

Primary Examiner—Mitchell J. Hill
Attorney, Agent, or Firm—Wayne B. Easton

[57] ABSTRACT

The control arrangement may be used for vehicles or in other steering systems and includes a steering motor that is adjusted as a function of hand operated steering mechanism, the steering mechanism controlling a directional section and a metering motor section. The directional section is fluidly connected between the steering motor and both of a tank and the metering motor section. A pump is connected between a tank and the metering motor section. The one sides of electromagnetic plus and negative valves are fluidly connected between the fluid connection of the metering motor section and the directional section while the opposite sides are respectively connected to the connection of the pump and the metering motor section and the connection of the directional section to the tank. A processing device for controlling the valves is provided for sensing the steering angle error. The control arrangement provides a simple structural arrangement to compensate for leakage.

1 Claim, 1 Drawing Sheet

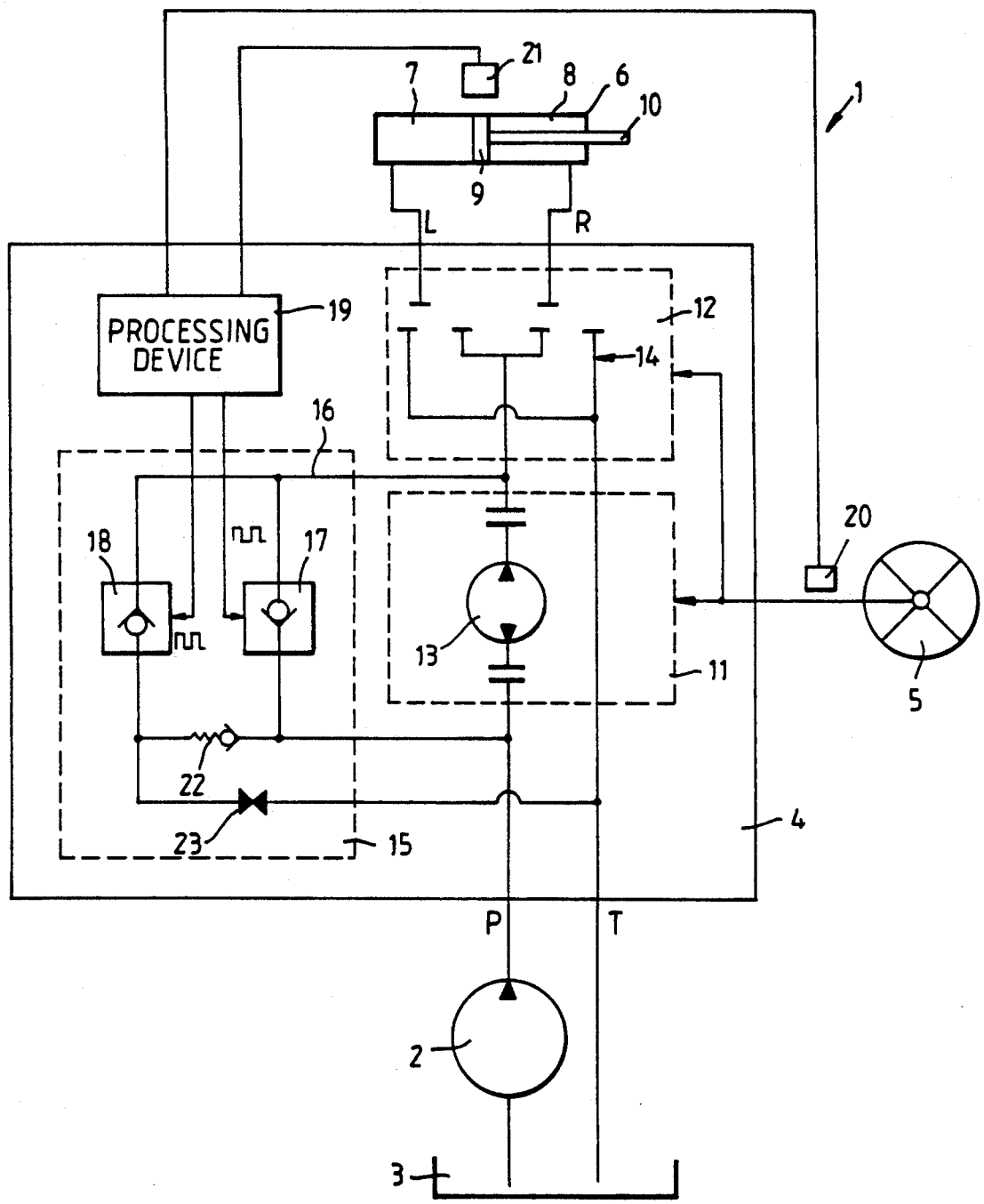

CONTROL ARRANGEMENT FOR A FULLY-HYDRAULIC STEERING SYSTEM

FIELD OF THE INVENTION

The invention relates to a control arrangement for a fully-hydraulic steering system, having a metering motor section, a directional section, which is connected to the metering motor section by way of a fluid path, a pump connection, a tank connection and two directional connections.

DESCRIPTION OF THE RELATED ART

Such steering arrangements are customarily used for fully-hydraulic steering systems. In these systems, the metering motor section conveys an amount of hydraulic fluid from the pump connection to the directional connection predetermined by the direction of movement of the steering handwheel; the directional connection effects a displacement of the steering motor by the distance covered or the angle traversed by the steering handwheel. The expression "steering system" is not intended to be restricted only to vehicle steering arrangements. A fully-hydraulic steering system can be understood to mean all systems in which a displacement of a working or steering motor is adjusted as a function of the displacement or rotation of an operating lever or steering handwheel. That may include, for example, also the positioning of an extension arm of a working machine. For ease of comprehension, however, reference will be made hereinafter to a vehicle steering system.

In a fully-hydraulic steering system, it is desirable to obtain correspondence between the position of the steering handwheel and the position of the steering motor. For example, a steered vehicle should drive straight ahead when the steering handwheel is in the "straight-ahead" position. Because of leakages, however, which may be caused by imperfectly sealing valves or pistons in the steering motor, it may happen that the steering handwheel angle and the steering motor angle differ from one another. In that case, it is desirable to compensate for the steering angle error. For this compensation, it is known from U.S. Pat. No. 4 703 819 to divert fluid from between the control arrangement and the steering motor and pass it directly to the tank, so that the steering handwheel can continue to rotate without the steering motor being constrained to follow this rotation. It is possible by that means to achieve correspondence between the positions of the steering handwheel and the steering motor. The drawback of this arrangement is that the construction is relatively complex, since valves have to be provided for each direction. In addition, the valves have to withstand a relatively large pressure. The pressure is not necessarily generated during steering, that is to say, when the steering motor is being operated. It can be generated when, with the steering control arrangement closed, external forces act on the steered wheels or the steered wheel and pressurize the hydraulic fluid enclosed in the working lines between the steering motor and steering control arrangement.

SUMMARY OF THE INVENTION

The invention is based on the problem of allowing steering error correction with the minimum of expenditure.

This problem is solved in a control arrangement of the kind mentioned in the introduction in that an auxiliary fluid path with a controllable valve arrangement is branched off the fluid path between the metering motor section and directional section and is connected to the pump connection and/or the tank connection.

By means of the auxiliary fluid path it is therefore possible in a simple manner and using simple means to change the displacement of the control unit within certain limits. It is then no longer necessary to provide a separate valve arrangement for each directional connection, that is, for each working line; on the contrary, the fluid flow conveyed from the control device is altered before it reaches the separate directional connections. The number of valves can therefore be halved. Furthermore, the valves need be dimensioned only for a relatively low pressure, namely the steering pressure. When no steering is taking place, that is to say, when the steering control arrangement has interrupted the connection between the pump and the steering motor, there is also no connection between the steering motor and the valve arrangement. The closing force of the valves can therefore be kept to a minimum. This means that relatively inexpensive valves can be used. Furthermore, any leakages in the valves do not become noticeable to a such an adverse extent as they do in an arrangement of the valves in the directional connections. Any leakage in the valve arrangement always affects the two sides of the steering motor equally. It is, however, still only possible to influence the steering motor when a connection has been produced between the valve arrangement and the steering motor via the directional section.

In a preferred construction, the auxiliary fluid path has a feed path, which is connected to the pump connection, and a bleed path, which is connected to the tank connection. By way of the feed path, it is possible to increase the displacement, that is to say, the feed rate, of the control arrangement, and by way of the bleed path it is possible to decrease the displacement. Because these two possibilities exist, when the steering motor is moved in each direction it is possible for both lagging and leading of the steering motor position with respect to the steering handwheel position to be compensated.

The valve arrangement preferably has rhythmically-controlled electromagnetic valves. The electromagnetic valves are triggered by way of a pulse-width modulated signal. The opening degree of the electromagnetic valves is produced as an average effect from the duty factor of the pulse-width modulated signal, that is to say, the ratio of the length of the pulse to the length of the cycles. Pulse-width modulated electromagnetic valves have a relatively low susceptibility to faults and their function can readily be monitored. The accuracy of adjustment is defined by the accuracy of the pulse-width modulated triggering signal.

In a preferred construction, a steering motor angle sensor and a steering handwheel angle sensor which are connected to a processing device are provided, the processing device ascertaining the steering angle error and changing the fluid flow in the fluid path by an auxiliary flow of fluid in the auxiliary fluid path in order to compensate for the steering angle error.

DESCRIPTION OF DRAWING

The invention is described hereinafter with reference to a preferred embodiment in conjunction with the drawing, in which the single Figure shows a steering system.

DESCRIPTION OF PREFERRED EMBODIMENT

A steering system 1 comprises a pump 2 which conveys hydraulic fluid from a tank 3 to a steering control arrangement 4. The steering control arrangement 4 comprises a pump connection P, which is connected to the pump 2, a tank connection T, which is connected to the tank 3, and two directional connections L, R, which are connected to a steering motor 6, or more accurately speaking, to a left-hand working chamber 7 and a right-hand working chamber 8 in the steering motor 6. The two working chambers 7, 8 are separated by a piston 9, to which is fixed a piston rod 10 which is connected to a wheel (not illustrated). When the piston 9 in the steering motor 6 moves, the wheel is steered.

The steering control arrangement 4 comprises in known manner a metering motor section 11 connected to the pump connection P and a directional section 12 which is connected at one side to the metering motor section 11 by way of a fluid path and at the other side to the directional connections R, L, which act as work connections. Both sections are controlled by the steering handwheel 5.

The metering motor section 11 has a metering motor 13. In the directional section 12, a directional valve 14 is opened by the steering handwheel 5. Fluid is then able to flow from the pump 2 by way of the metering motor 13 and the corresponding directional connection L, R into the corresponding working chamber 7, 8 of the steering motor 6. The metering motor 13 ascertains the amount of fluid that has flowed through and closes the directional valve 14 again when an amount of hydraulic fluid corresponding to the angle of rotation of the steering handwheel 5 has reached the steering motor 6. There is a respective connection between the pump 2 and the steering motor 6, and the steering motor 6 and the tank 3, only until the steering motor 6 has assumed a position which corresponds to the position of the steering handwheel 5. Once this corresponding state has been reached, that is to say, when an adequate amount of hydraulic fluid has flowed into the steering motor 6, the directional valve 14 interrupts these connections.

Parallel with the metering motor section 11 there is arranged a valve arrangement 15 which bridges the metering motor section 11. The valve arrangement 15 branches off from the fluid path between the metering motor section 11 and the directional section 12 and is arranged in an auxiliary fluid path 16 which is connected to the pump connection P and the tank connection T respectively. The connection is effected by way of a plus valve 17, via which the hydraulic fluid can be conveyed from the pump 2 to the directional connection 12, and a minus valve 18, via which the fluid is returned from the fluid path between the metering motor section 11 and the directional section 12 to the tank connection T, that is to say, can be removed from the fluid path.

The plus valve 17 and the minus valve 18 are constructed as pulse-width modulation controlled electromagnetic valves. These electromagnetic valves have an open position and a closed position. On the appearance of a pulse, they go into the open position. At the end of the pulse they return to the closed position and block completely the passage for the fluid. The opening degree of such valves is adjusted by way of the duty factor, that is to say the ratio of the pulse length to the cycle length.

The plus valve 17 and the minus valve 18 are controlled by a processing device 19. This processing device is connected to a sensor 20 for sensing the angle of the steering handwheel and a sensor 21 for sensing the angle of the steering motor. The processing device 19 ascertains the steering angle error, that is, the difference between the steering handwheel angle and the steering motor angle, and compensates for this error by correspondingly opening the plus valve 17 or the minus valve 18. The compensation can be effected in such a manner that the auxiliary fluid flow generated by the plus valve 17 or the minus valve 18 is dependent on the steering handwheel speed and/or the steering angle error.

If, for example the position of the steering handwheel 5 is lagging behind the position of the steering motor 6, the processing device 19 opens the minus valve 18, that is to say, the steering handwheel can be rotated without a corresponding movement of the steering motor 6 being effected. If, in another case, the position of the steering handwheel 5 is in advance of the position of the steering motor 6, the processing device 19 opens the plus valve so that an additional auxiliary fluid flow is conveyed to the steering motor 6. The steering motor 6 therefore continues to move as though it were actually corresponding to the position of the steering handwheel 5.

Between the pump connection P and tank connection T there is arranged an excess pressure valve 22. This prevents too great a pressure acting on the plus valve 17 or the minus valve 18. High pressure cannot be generated by the steering motor 6 either, because, should the steering motor 6 not be actuated, there is no connection between the auxiliary fluid path 16, and thus between the plus valve 17 and the minus valve 18, and the steering motor 6. The excess pressure valve 22 furthermore prevents the pump pressure acting directly on the minus valve 18. If this were to be the case, no fluid would be able to be conveyed by way of the minus valve to the tank 3. A throttle 23 prevents too much fluid being pumped by the pump 2 directly into the tank 3.

We claim:
1. A steering system for motor vehicles, comprising,
   a steering motor having steering actuating means and left and right oppositely expansible chambers for effecting movement of said actuating means,
   first sensor means for indicating the displacement of said actuating means,
   a steering control unit with pump and tank ports and left and right motor ports,
   pump and tank means connected to said pump and tank ports,
   means connecting said left and right motor ports respectively to said steering motor expansible chambers,
   said steering unit having a metering motor supplied with pressurized fluid via said pump port,
   said steering unit having directional steering control means for selectively and alternately effecting the pressurizing and exhausting of said expansible chambers via said left and right motor ports,
   steering handwheel means for operating said steering unit,
   second sensor means for indicating the displacement of said steering handwheel means,
   negative and positive valve means each having one end thereof connected to the upstream side of said directional steering control means with said positive valve means having the opposite end thereof conned to said pump port and said negative valve means having the opposite end thereof connected to tank port, means for comparing the outputs of said first and second sensor means to determine the offset of one relative to the other, and means for selectively operating said valves in accordance with said offset to accordingly route additional fluid via said positive valve means directly from said pump port to the upstream side of said direction steering control means or route a fractional part of said fluid via said negative valve means from the upstream side of said direction steering control means to said tank port.

* * * * *